Figure 1:
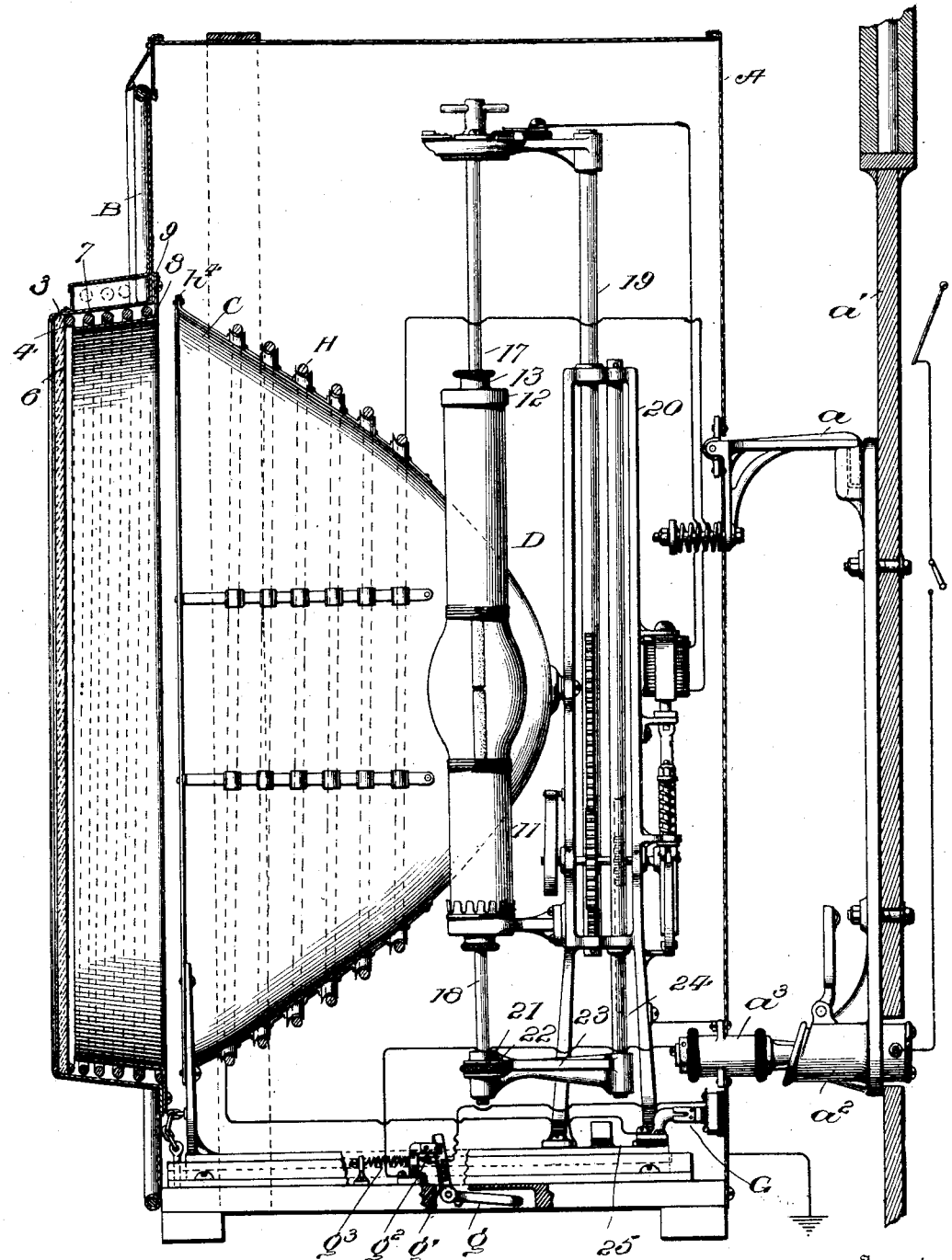

No. 686,172. Patented Nov. 5, 1901.
H. P. WELLMAN.
ELECTRIC HEADLIGHT LAMP.
(Application filed Nov. 14, 1899.)

(No Model.) 6 Sheets—Sheet 1.

Witnesses
Inventor
Attorney

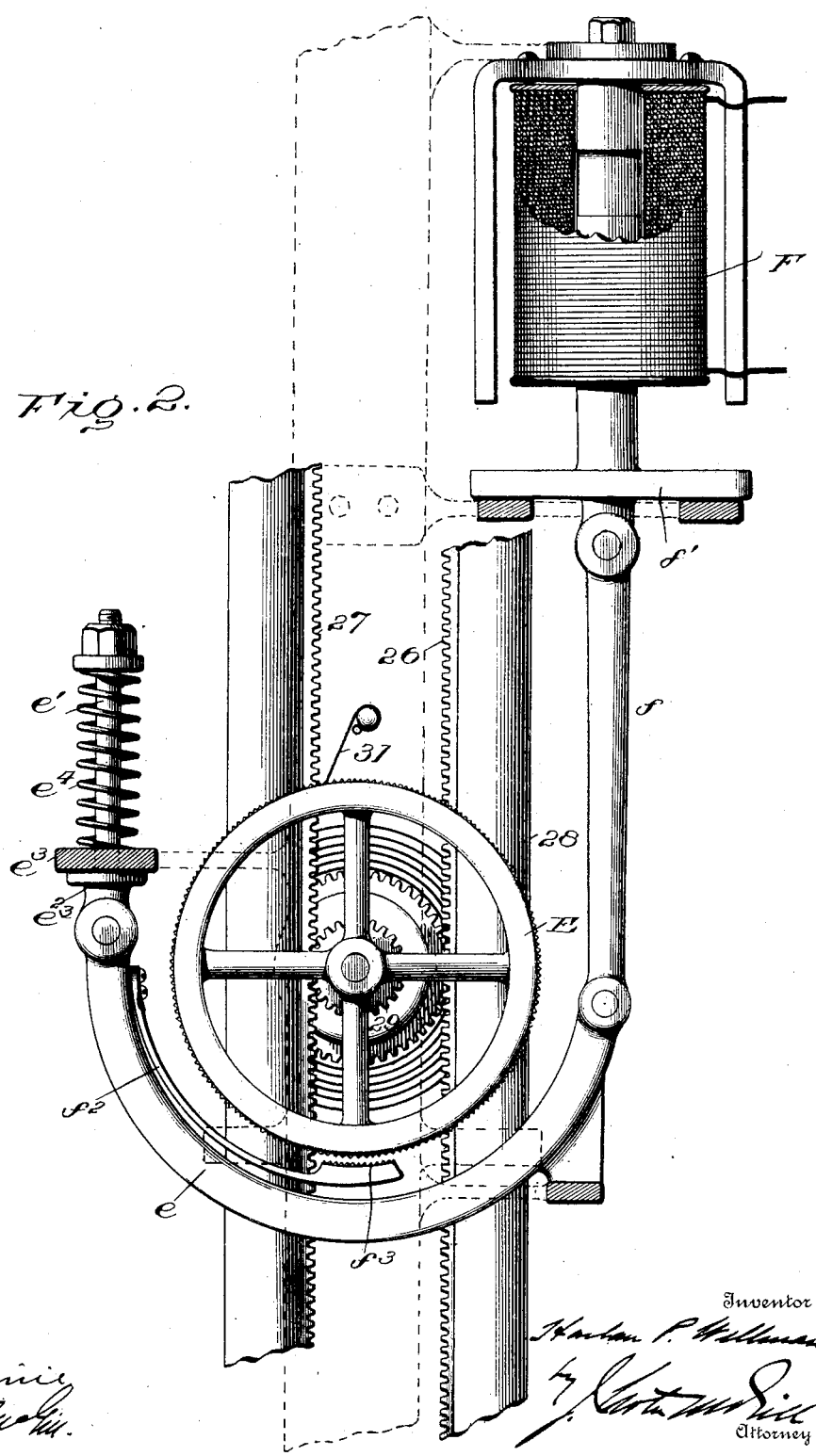

No. 686,172. Patented Nov. 5, 1901.
H. P. WELLMAN.
ELECTRIC HEADLIGHT LAMP.
(Application filed Nov. 14, 1899.)
(No Model.) 6 Sheets—Sheet 3.
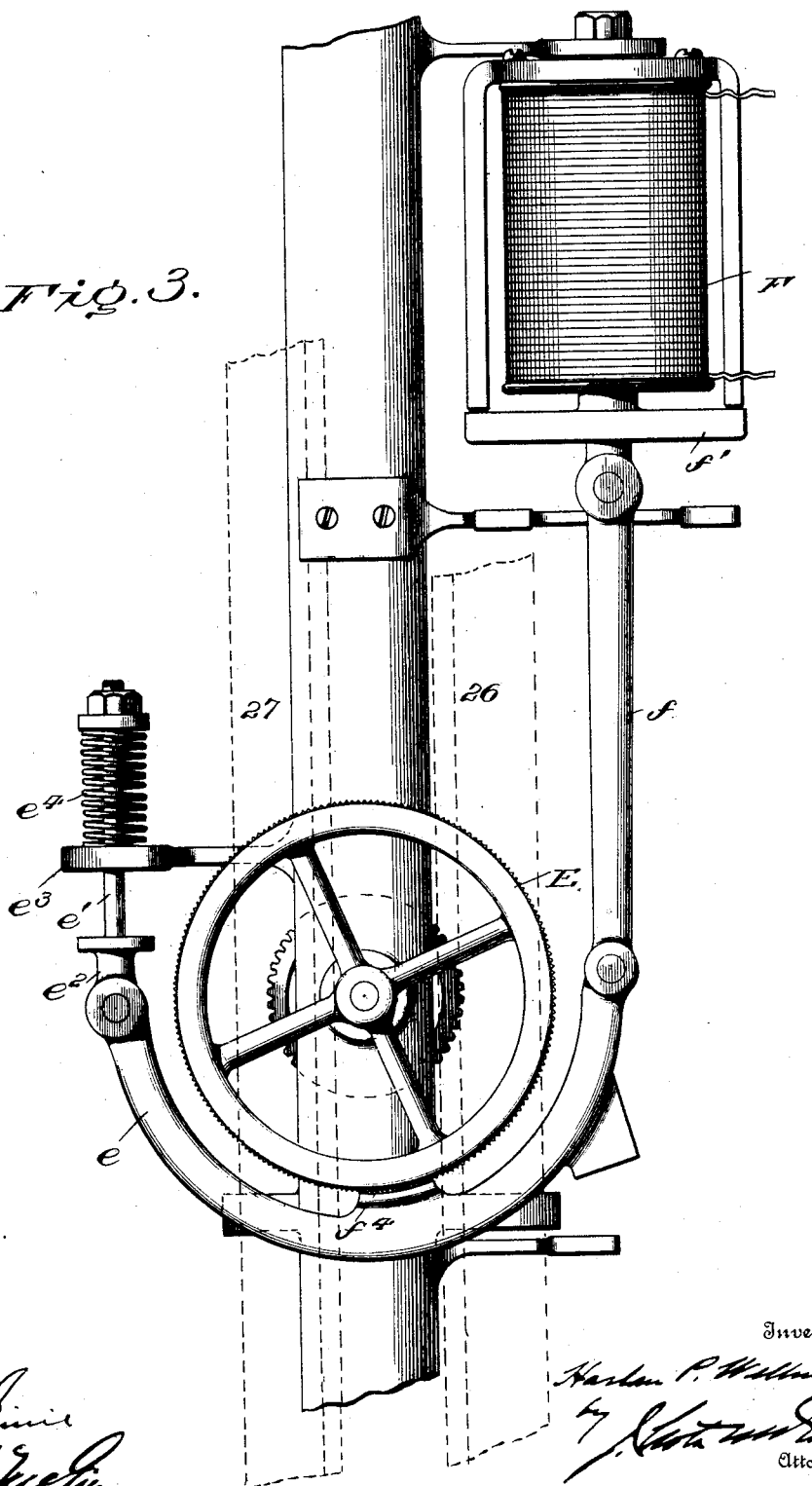

No. 686,172. Patented Nov. 5, 1901.
H. P. WELLMAN.
ELECTRIC HEADLIGHT LAMP.
(Application filed Nov. 14, 1899.)
(No Model.) 6 Sheets—Sheet 4.
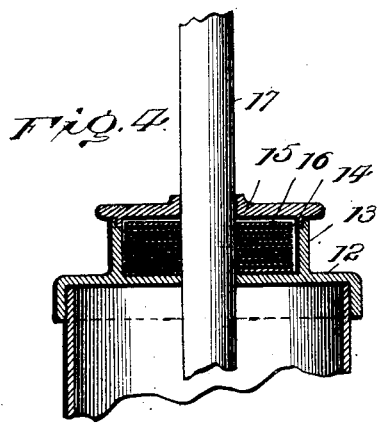
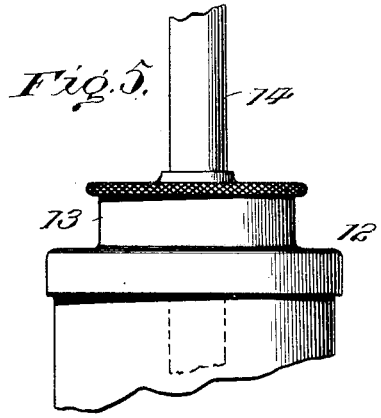
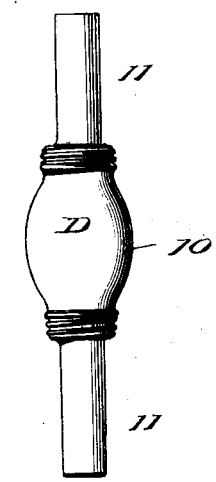
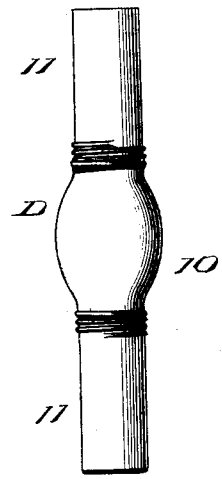
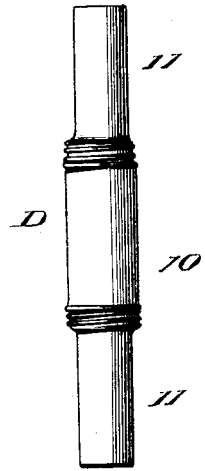
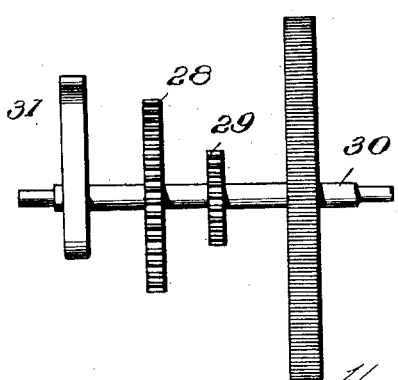

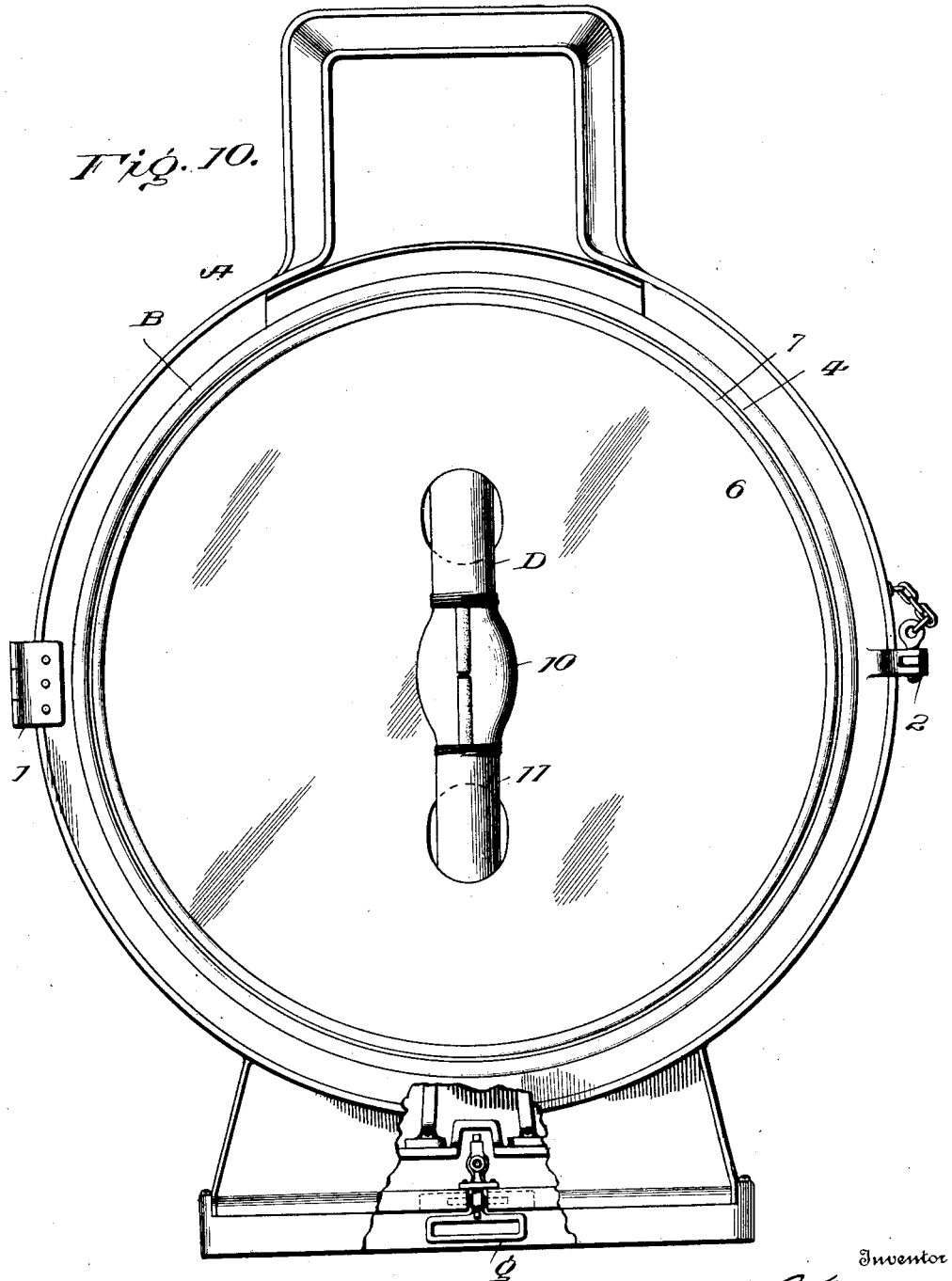

No. 686,172. Patented Nov. 5, 1901.
H. P. WELLMAN.
ELECTRIC HEADLIGHT LAMP.
(Application filed Nov. 14, 1899.)
(No Model.) 6 Sheets—Sheet 6.
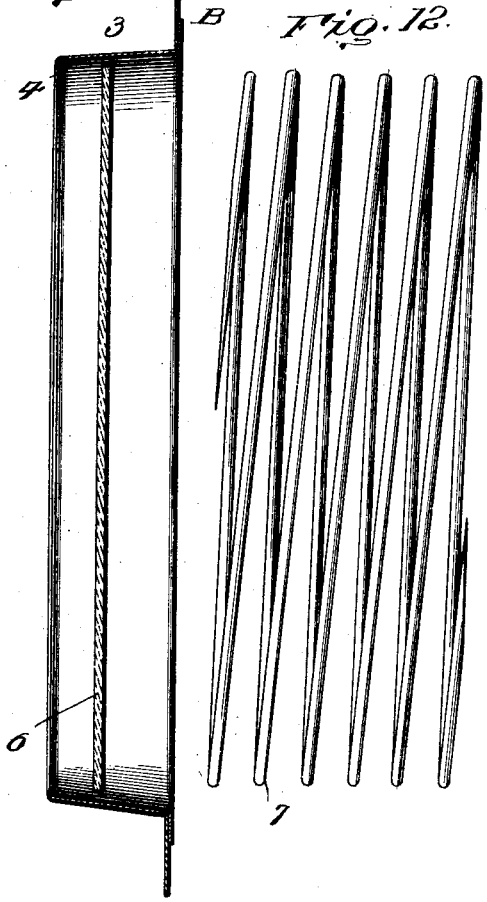
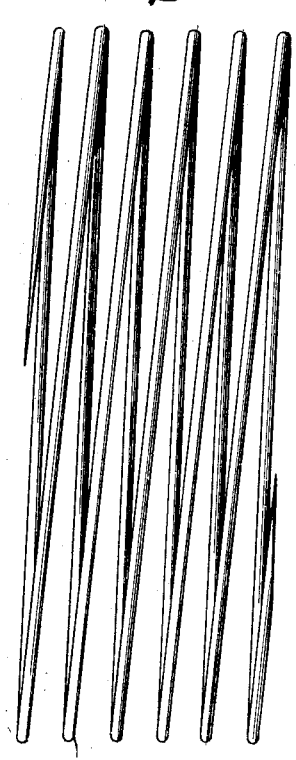
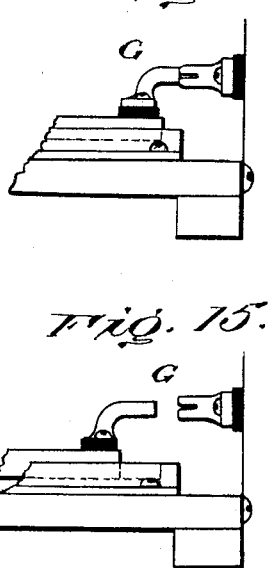
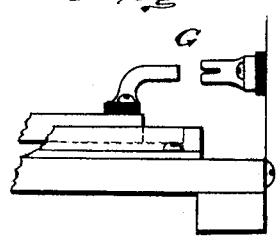
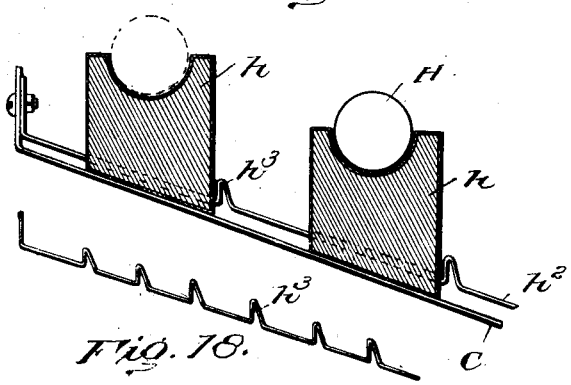
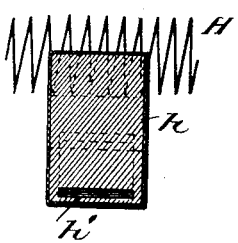
Witnesses
Inventor
Attorney
THE NORRIS PETERS CO., PHOTO-LITHO., WASHINGTON, D. C.

UNITED STATES PATENT OFFICE.

HARLAN P. WELLMAN, OF ASHLAND, KENTUCKY.

ELECTRIC HEADLIGHT-LAMP.

SPECIFICATION forming part of Letters Patent No. 686,172, dated November 5, 1901.

Application filed November 14, 1899. Serial No. 736,957. (No model.)

*To all whom it may concern:*

Be it known that I, HARLAN P. WELLMAN, of Ashland, in the county of Boyd and State of Kentucky, have invented certain new and useful Improvements in Electric Headlight-Lamps; and I do hereby declare the following to be a full, clear, and exact description of the invention, such as will enable others skilled in the art to which it appertains to make and use the same.

This invention contemplates certain new and useful improvements in electric headlight-lamps for electric-railway cars.

The objects of the invention are, first, to provide improved means for preventing the jarring or jolting of a car or lamp from breaking or interrupting the arc and avoid feeding the carbons together except upon the total interruption of current through the lamp-circuit; second, to so locate the resistance-coil that it will be out of the way and consume but little space; third, to provide an automatic switch for opening and closing the lamp-circuit when the interior parts of the lamp are removed from or placed in the lamp-casing; fourth, to provide a switch for cutting out the lamp-circuit in removing the lamp from its suspended position; fifth, to provide a new form of arc-inclosure, and, sixth, to improve the construction and general efficiency of an electric headlight-lamp.

The invention will be hereinafter fully set forth, and particularly pointed out in the claims.

In the accompanying drawings, Figure 1 is a view showing the parts of my lamp in vertical section and side elevation. Fig. 2 is an enlarged view of the brake for controlling the carbon-feeding mechanism. Fig. 3 is a similar view embodying a slight modification. Fig. 4 is a vertical sectional view of the upper end of the arc-inclosure. Fig. 5 is an exterior view thereof. Figs. 6, 7, and 8 show different forms of arc-inclosures. Fig. 9 is a plan view of parts of the carbon-feeding mechanism. Fig. 10 is a front end view of the lamp with parts broken away. Figs. 11, 12, and 13 show the parts of the lamp-door. Figs. 14 and 15 are views of the automatic switch of the lamp-frame. Figs. 16, 17, and 18 are enlarged views of the means employed for supporting the resistance-coils.

Referring to the drawings, A designates the lamp-casing; $a$, a hook by which the casing is suspended from a car-dash $a'$; $a^2$, a circuit-closer also secured to said dash, and $a^3$ a projecting terminal carried by casing A for engaging the circuit-closer $a^2$, these two last-mentioned features being embraced by Letters Patent No. 630,475, issued to me August 8, 1899.

B designates the door of casing A, hinged at 1 and designed to be locked at 2. It is composed of a forwardly-projecting rim 3, having a circular opening surrounded by a flange 4, against which the glass disk 6 is held as against rattling by a coil-spring 7, located within rim 3 and held compressed therein by a cap 8. This cap has a flange 9, which is secured to the inner flange of door-rim 3. The cap 8 and rim 3 are slightly tapered, as shown in Figs. 1, 11, and 13, and the cap is less in diameter and depth than the rim for the purpose of accommodating and concealing the spring 7. When the cap 8 is secured in place, the compression of the spring will firmly hold the glass as against rattling. The diameter of the coil-spring 7 is approximately the same as that of the glass disk 6, near the circumference of which it bears.

C is a parabolic reflector, through upper and lower openings in which is passed the arc-inclosure D. This arc-inclosure is composed of a central section 10 and two end sections 11. These sections may be all made of practically uniform diameter, as shown in Fig. 8, or the central section 10, which is of transparent or translucent material, may be bulged, as shown in Figs. 6 and 7. The end sections 11 are opaque and preferably of metal, silvered or nickeled on the outside. The end sections are united to the central section by screw-threads. The ends of the arc-inclosure are covered by caps 12, provided with flanges 13, forming recesses 14, which are closed by nuts 15. Within each recess 14 are placed a number of washers 16. Through openings in these washers and in the caps and nuts are passed the positive and negative carbon rods 17 and 18. The series of washers 16 assist in keeping a comparatively tight contact between the arc-inclosure caps and the carbon rods and also assist in cleaning and scraping from such rods products of combustion prevalent within the inclosure. The positive carbon rod 17 is suitably connected at its upper end to its adjusting-rod 19, which is movable vertically within a frame 20, while the negative carbon rod is provided with a milled nut 21, located within the bifurcated end 22 of an arm 23, fast on the adjusting-rod 24, also movable vertically within frame 20. By turning nut 21 the rod 18 may be adjusted in relation to its support. The frame 20 is mounted on a base 25, which is removably located within casing A—that is, together with the interior parts of the lamp, it may be readily withdrawn from or inserted into the latter. The reflector C is also secured at its apex to frame 20. The adjusting-rods 19 and 24 of the positive and negative carbons, respectively, are provided with well-known gravity-adjusting mechanism, comprising rack-bars 26 and 27, which mesh, respectively, with large and small gear-wheels 28 and 29 on a common shaft 30, the rotation of which will effect the movement of the carbons toward or away from each other, such movements being by reason of the difference in diameter between wheels 28 and 29 and the greater leverage exerted by the former commensurate with the relative consumption of the positive and negative carbons. The spring 31, attached at one end to shaft 30 and at its other end to frame 20, constantly tends to cause the rotation of said shaft and keep the two carbons in contact. On this shaft 30 I have mounted a brake-wheel E, which is serrated on its periphery. Partially surrounding this wheel and having a movement in part concentric therewith is a brake-shoe $e$, which at one end is pivoted to a bolt $e'$, the lower head $e^2$ of which is normally held up against a stud $e^3$ of frame 20 by a coil-spring $e^4$. The other end of this brake-shoe $e$ is connected by a link $f$ to the armature $f'$ of a solenoid-magnet F, which is within the lamp-circuit. To the inner face of brake-shoe $e$ is secured one end of a curved spring $f^2$, the free end $f^3$ of which is serrated and designed to engage the serrated periphery of the brake-wheel. This engagement between the spring of the brake-shoe and the brake-wheel exists only when the lamp-circuit is completed and the solenoid-magnet F is acting upon the armature $f'$. Instantly the arc is formed the magnet F, drawing on armature $f'$, causes the brake-shoe to instantly engage with the brake-wheel, such shoe being moved concentric with the axis of the brake-wheel. This engagement between the brake-shoe and the brake-wheel prevents feeding of the carbons together when the lamp is burning. No amount of jumping or jolting of the car or violent shaking of the lamp can change the relative positions of the carbons. The carbons will not be fed except upon a total interruption of the current throught he lamp-circuit, either momentarily or permanently. The instant such interruption occurs the release of armature $f'$ will disengage the brake-shoe and brake-wheel and permit the feeding mechanism to feed the carbons together, and thus reëstablish the current in the lamp-circuit. By providing the serrated surface of the brake-shoe on the end of spring $f^2$ the first impact or shock to the brake-wheel when the shoe is operated upon through the solenoid-magnet is relieved. However, the serrated portion of the brake-shoe may be formed directly on the shoe, as shown at $f^4$, Fig. 3, omitting the spring $f^2$.

The frame 20 and its base 25 may be readily removed from the lamp-casing A, and for the purpose of breaking the lamp-circuit when such removal occurs and reëstablishing such circuit when the interior parts are replaced within the casing I provide an automatic switch G, (shown in Figs. 1, 14, and 15,) such switch being composed of two contact-terminals secured one to casing A and the other to base 25. When the interior parts of the lamp are slid into their customary places, these contact-terminals meet and convey the electrical current from the exterior to the interior of the lamp without the necessity of securing-wires.

For the purpose of interrupting the current through the lamp-circuit simultaneous with the removal of the lamp from its operative position on the car-dash I provide a movable handle $g$, mounted in a recess in the bottom of the lamp-casing A. This handle has an arm $g'$, which is normally held in contact with the terminal $g^2$ by means of a spring $g^3$, the whole constituting an automatic switch electrically connected in the lamp-circuit. Upon taking hold of the handle $g$ to remove the lamp from its operative position these switch-contacts are opened as against the tension of spring $g^3$, interrupting the lamp circuit and extinguishing the light.

The resistance-coil H is spirally wound around the outside of the reflector C and so supported thereon as to be out of the way and prevented from being displaced. Various means may be employed for retaining the coil on the reflector; but that shown consists of porcelain blocks $h$, having concavities in their outer ends to accommodate the coils, while in the inner ends of these blocks are slots $h'$ to accommodate metal strips $h^2$, which latter are crimped or kinked at $h^3$ adjacent to each block to prevent the latter from slipping. These metal strips $h^2$ are secured to the outside of the reflector. (See Figs. 1, 16, 17, and 18.)

In operation upon the lamp being hung on the car-dash it will at once light, provided the main car-lighting switch is closed. Upon each total interruption of current through the lamp-circuit from any cause the carbons are immediately fed together by gravity and the light is at once reëstablished upon the restoration of the current. If the arc is very long and the current reduced, the compression-spring $e^4$ of the brake-shoe will overcome the power of the magnet F and disengage such shoe from the brake-wheel of the carbon-rod-feed mechanism, allowing the latter to operate under the tension of its impelling-spring, thereby feeding the carbons together and affecting the relighting of the lamp with the arc of normal length. While the contact between the brake-shoe and the brake-wheel exists it is impossible for the carbons to be fed together or moved apart by any jarring or jolting of the lamp by outside sources except when the current is interrupted through the lamp-circuit. It will be observed that in removing the lamp from its suspended position the lamp-circuit is first opened by the turning of the handle $g$. It will also be noted that in the removal or repositioning of the interior parts of the lamp the lamp-circuit is automatically broken or restored, that the resistance-coil by being located on the exterior of the reflector consumes but little space and is out of the way of other parts of the lamp, and that by providing the lamp-door with the compression-spring bearing against the glass all jarring or rattling of the latter is avoided.

Various changes may be made in the construction of the lamp without departing from the scope of my invention. For instance, a shunt-coil may also be connected with the armature $f'$ to oppose the action of the series coil and act in unison with the spiral spring $e^4$, assisting in feeding the carbons together.

I claim as my invention—

1. The combination with the lamp-casing, and the door having an opening and a surrounding rim, of a glass located over said opening within such rim, a coil-spring of less diameter than that of the glass, also located within the rim and bearing against the glass, a cap fitted within the rim and inclosing said spring, and means for securing said cap to the door for compressing the spring against the glass, substantially as set forth.

2. In an electric headlight-lamp having a reflector, a resistance-coil on the outside of such reflector, spaced-apart blocks arranged in series, each block having a groove to accommodate said coil, and means for holding the blocks of each series in fixed relation to one another, substantially as set forth.

3. In an electric headlight-lamp having a reflector and a resistance-coil located on the outside of such reflector, blocks for supporting the coil arranged in series, each of the blocks having a slot therein, and a series of strips secured to the reflector, said strips being inserted through said slots for holding the blocks of each series in fixed relation to one another, substantially as set forth.

4. In an electric headlight-lamp having a reflector, a resistance-coil on the outside of such reflector, blocks for supporting such coil arranged in series and having slots therein, a series of strips secured to said reflector designed to be inserted through said slots, and having kinks formed therein adjacent to each block, substantially as set forth.

5. In an electric headlight-lamp having a handle, and an automatic switch with which said handle is connected, said switch being connected with the lamp-circuit, whereby in removing the lamp from its operative position the lamp-circuit is opened by moving said handle, as set forth.

6. In an electric headlight-lamp having a two-part automatic switch, a handle to which one of said parts is secured, and a spring for normally holding said parts in electrical contact, said switch being connected with the lamp-circuit, whereby in removing the lamp from its operative position the lamp-circuit is opened by moving said handle, substantially as set forth.

7. The combination with the casing, and the lamp mechanism removably located therein, of an automatic switch, one terminal of which is secured to said casing and the other to said parts, said switch being in the lamp-circuit, whereby in removing said parts from, or replacing them in, the casing, the lamp-circuit will be opened or closed, as set forth.

8. In an electric lamp having positive and negative carbons, and mechanism for feeding such carbons together comprising vertically-movable rack-bars, and a shaft having pinions engaging said rack-bars, a brake-wheel fast on said shaft, a curved brake-shoe concentric with and partially surrounding said brake-wheel, a bolt to which one end of said shoe is connected, a stationary stud through which the bolt is passed, a spring engaging said bolt and stud, a magnet within the lamp-circuit, and a link connecting said brake-shoe to the armature of said magnet, substantially as set forth.

9. In an electric lamp having positive and negative carbons and mechanism for feeding such carbons together comprising vertically-movable rack-bars and a shaft having pinions engaging said rack-bars, a brake-wheel fast on said shaft having a serrated periphery, a brake-shoe concentric with and partially surrounding said brake-wheel, a spring secured at one end to said brake-shoe and having a serrated portion designed to engage the periphery of said wheel, a second spring tending to hold said former spring out of engagement with said brake-wheel, a magnet within the lamp-circuit, and a link connecting the armature of said magnet to said brake-shoe, substantially as set forth.

In testimony whereof I have signed this specification in the presence of two subscribing witnesses.

HARLAN P. WELLMAN.

Witnesses:
W. C. RICHARDSON,
OSCAR HENTHORNE.